United States Patent
Katayama et al.

(10) Patent No.: US 12,275,388 B2
(45) Date of Patent: Apr. 15, 2025

(54) ADAPTATION SYSTEM AND ADAPTATION METHOD

(71) Applicant: TOYOTA JIDOSHA KABUSHIKI KAISHA, Toyota (JP)

(72) Inventors: Akihiro Katayama, Toyota (JP); Shiro Yano, Tokyo (JP); Kenichiro Kumada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/419,369

(22) Filed: Jan. 22, 2024

(65) Prior Publication Data

US 2024/0300470 A1 Sep. 12, 2024

(30) Foreign Application Priority Data

Feb. 20, 2023 (JP) ................. 2023-024534

(51) Int. Cl.
*B60W 10/06* (2006.01)
*B60W 50/00* (2006.01)

(52) U.S. Cl.
CPC ............ *B60W 10/06* (2013.01); *B60W 50/00* (2013.01); *B60W 2050/0088* (2013.01); *B60W 2420/54* (2013.01); *B60W 2510/0685* (2013.01); *B60W 2520/105* (2013.01)

(58) Field of Classification Search
CPC .............. B60W 10/06; B60W 50/00; B60W 2050/0088; B60W 2420/54; B60W 2510/0685; B60W 2520/105
See application file for complete search history.

(56) References Cited

U.S. PATENT DOCUMENTS

| | | | |
|---|---|---|---|
| 2018/0026573 A1 | 1/2018 | Akashi et al. | |
| 2021/0213966 A1* | 7/2021 | Hashimoto | ......... B60W 50/082 |
| 2021/0254571 A1* | 8/2021 | Hashimoto | ......... F02D 41/2422 |
| 2022/0044502 A1* | 2/2022 | Bunazawa | ............... G06N 5/04 |

FOREIGN PATENT DOCUMENTS

| | | | | |
|---|---|---|---|---|
| JP | 2018014838 A | | 1/2018 | |
| JP | 2019211806 A | | 12/2019 | |
| JP | 2021066418 A | * | 4/2021 | ........... B60K 7/0007 |
| JP | 2022140092 A | | 9/2022 | |

OTHER PUBLICATIONS

Machine Translation of JP2021066418A PDF File Name: "JP2021066418A_Machine_Translation.pdf".*

* cited by examiner

*Primary Examiner* — Grant Moubry
*Assistant Examiner* — Ruben Picon-Feliciano

(57) ABSTRACT

Until a specified condition is met, a processing circuitry of an adaptation system executes a first trial and a second trial in each execution of a learning routine, reflects, in a control map, a change in the trial with a larger reward, and ends the learning routine (first process). After the specified condition is met, the processing circuitry executes the first trial and the second trial multiple times in each learning routine, compares the reward for the multiple executions of the first trial with the reward for the multiple executions of the second trial, and reflects, in a control map, a change in the trial with the larger reward, and ends the learning routine (second process).

8 Claims, 3 Drawing Sheets

ADAPTATION SYSTEM AND ADAPTATION METHOD

BACKGROUND

1. Field

The present disclosure relates to an adaptation method and an adaptation system for optimizing a function used to control a motor.

2. Description of Related Art

Japanese Laid-Open Patent Publication No. 2018-014838 discloses a machine learning device that learns a current command value of a motor. The machine learning device acquires a state variable while driving a motor in a learning process. Then, the machine learning device calculates a reward based on the state variable. The machine learning device learns the current command value based on the reward.

An adaptation system may be used to automatically optimize a function for outputting a command value to a motor. In this case, the adaptation system performs a trial for acquiring a state variable while driving the motor. The adaptation system evaluates the content of the trial using the reward calculated based on the state variable. The adaptation system updates and learns the function according to the evaluation. In this manner, the adaptation system optimizes the function by gradually updating the function through repeated trials, evaluations, and learning.

As the optimization of the function approaches completion, it is preferable for the learning to gradually converge. However, due to the influence of accidental fluctuations in state variables caused by noise in signals from sensors, there are cases where learning becomes difficult to converge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an adaptation system for optimizing a function used to control a motor includes processing circuitry and a storage device. The processing circuitry is configured to repeat a learning routine, thereby optimizing the function to be stored in a control device for controlling the motor. The learning routine includes a trial that drives the motor while acquiring a state variable by a sensor in a state in which a change has been added to the function for outputting a command value to the motor, an evaluation that calculates a reward based on the acquired state variable, and learning that updates the function based on the reward. The processing circuitry is configured to execute a first process that, until a specified condition for determining that optimization has progressed to a final stage is met, performs a first trial and a second trial in which the change is added to the function so as to adjust, in a sign reversing direction, the command value output from the function in each execution of the learning routine, updates the function by reflecting, in the function, the change in one of the first trial and the second trial in which the reward is larger, and ends the learning routine. The processing circuitry is also configured to execute a second process that , after the specified condition is met, executes the first trial and the second trial multiple times in each learning routine, compares the reward for the multiple executions of the first trial with the reward for the multiple executions of the second trial, updates the function by reflecting, in the function, the change in one of the first trial and the second trial in which the reward is larger, and ends the learning routine.

In another general aspect, an adaptation method for optimizing a function used to control a motor using an adaptation system is provided. The adaptation system includes processing circuitry and a storage device. The adaptation method includes causing the processing circuitry to repeat a learning routine, thereby optimizing the function to be stored in a control device for controlling the motor. The learning routine includes a trial that drives the motor while acquiring a state variable by a sensor in a state in which a change has been added to the function for outputting a command value to the motor, an evaluation that calculates a reward based on the acquired state variable, and learning that updates the function based on the reward. The adaptation method includes causing the processing circuitry to execute a first process that, until a specified condition for determining that optimization has progressed to a final stage is met, performs a first trial and a second trial in which the change is added to the function so as to adjust, in a sign reversing direction, the command value output from the function in each execution of the learning routine, updates the function by reflecting, in the function, the change in one of the first trial and the second trial in which the reward is larger, and ends the learning routine. The adaptation method also includes causing the processing circuitry to execute a second process that, after the specified condition is met, executes the first trial and the second trial multiple times in each learning routine, compares the reward for the multiple executions of the first trial with the reward for the multiple executions of the second trial, updates the function by reflecting, in the function, the change in one of the first trial and the second trial in which the reward is larger, and ends the learning routine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of an adaptation system will now be described with reference to FIGS. 1 to 5.

Configuration of Adaptation System 100

Figure 1:
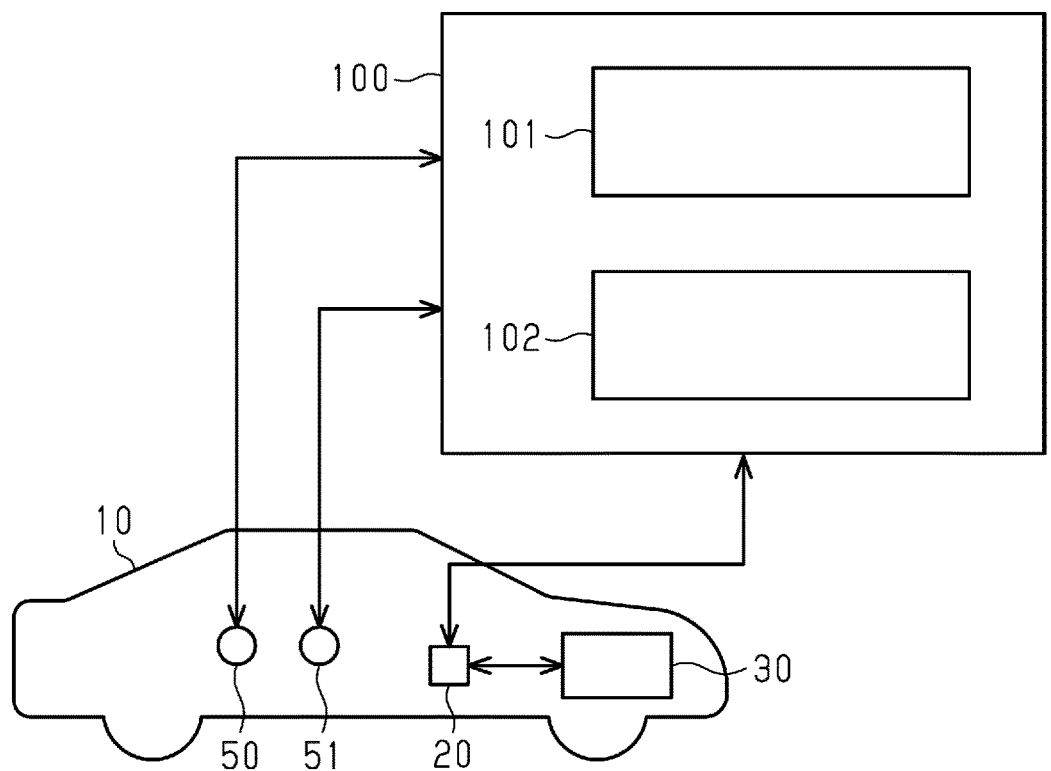
FIG. 1 is a schematic diagram showing a configuration of an adaptation system and a relationship between the adaptation system and a vehicle.

As shown in FIG. 1, the adaptation system 100 includes a processing circuit 101 and a storage device 102. The storage device 102 stores programs and data. The processing circuitry 101 executes a program stored in the storage device 102. The vehicle 10 is equipped with a hybrid system 30 and a control device 20 that controls the hybrid system 30. The adaptation system 100 optimizes the function stored in the control device 20.

Configuration of Power Train of Vehicle 10

Figure 2:
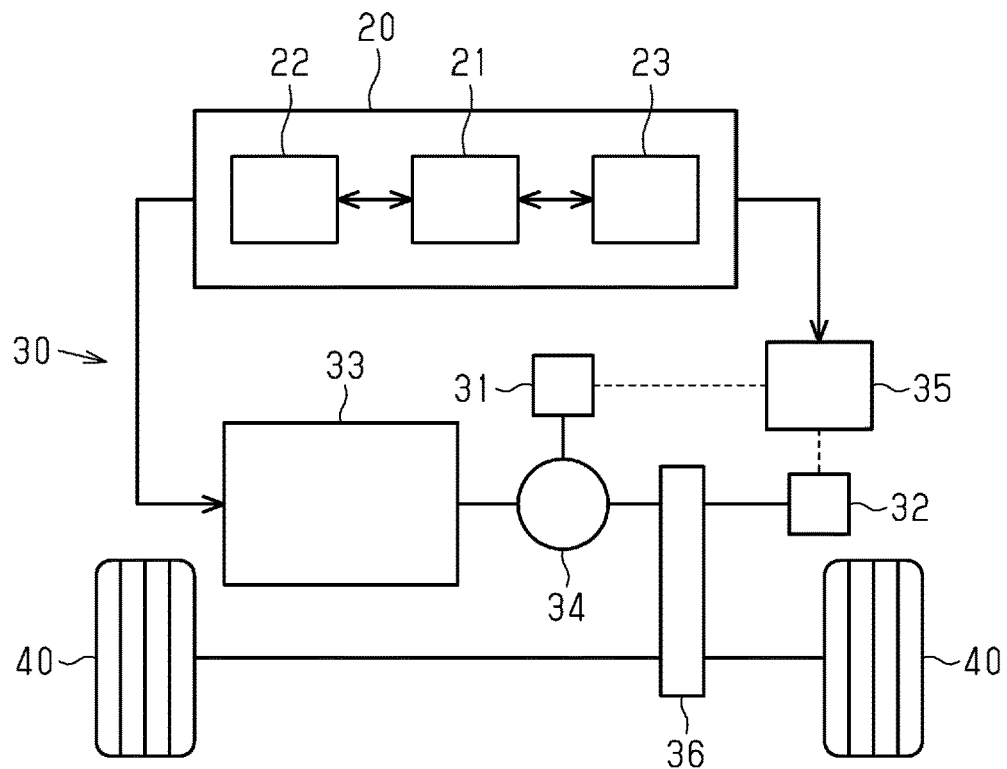
FIG. 2 is a schematic diagram showing a configuration of a power train of the vehicle.

As shown in FIG. 2, the vehicle 10 includes a power train including a hybrid system 30. The vehicle 10 drives the driven wheels 40 by the hybrid system 30. The hybrid system 30 includes a first motor-generator 31, a second motor-generator 32, an engine 33, a power splitting mechanism 34, a power control unit 35, and a speed reduction mechanism 36.

The second motor-generator 32 is connected to the power control unit 35. The second motor-generator 32 is coupled to the driven wheels 40 via the speed reduction mechanism 36. The engine 33 is coupled to the driven wheels 40 via the power splitting mechanism 34 and the speed reduction mechanism 36. The first motor-generator 31 is coupled to the power splitting mechanism 34. The first motor-generator 31 is, for example, a three phase AC motor-generator.

The power splitting mechanism 34 is constituted by a planetary gear. The power splitting mechanism 34 can split the driving force of the engine 33 between the first motor-generator 31 and the driven wheel 40. The first motor-generator 31 generates electric power by the driving force of the engine 33 or by the driving force from the driven wheel 40. The first motor-generator 31 drives a crankshaft of the engine 33 when the engine 33 is started. Therefore, the first motor-generator 31 is a motor that drives the crankshaft of the engine 33 to crank the engine 33.

The first motor-generator 31 and the second motor-generator 32 are connected to a battery via a power control unit 35. The AC power generated by the first motor-generator 31 is converted into DC power by the power control unit 35, and the battery is charged with the DC power. That is, the power control unit 35 functions as an inverter.

The DC power of the battery is converted into AC power by the power control unit 35 and supplied to the second motor-generator 32. When the vehicle 10 is decelerated, power is generated by the second motor-generator 32 using the driving force from the driven wheels 40. The battery is charged with the generated electric power. That is, regenerative charging is performed in the vehicle 10. At this time, the second motor-generator 32 functions as a generator. The AC power generated by the second motor-generator 32 is converted into DC power by the power control unit 35, and the battery is charged with the DC power. When the engine 33 is cranked by the first motor-generator 31, the power control unit 35 converts DC power of the battery into AC power and supplies the AC power to the first motor-generator 31.

Control Device 20

A control device 20 controls the engine 33, the first motor-generator 31, and the second motor-generator 32. The control device 20 includes the engine control unit 22, which controls the engine 33. The control device 20 includes a motor control unit 23 that controls the first motor-generator 31 and the second motor-generator 32 by controlling the power control unit 35. Further, the control device 20 includes a general control unit 21 which is connected to the engine control unit 22 and the motor control unit 23 and performs general control of the vehicle 10. Each of these control units includes processing circuitry and a memory storing programs executed by the processing circuitry.

As described above, the control device 20 controls the engine 33, the first motor-generator 31, and the second motor-generator 32. That is, the control device 20 controls the power train of the vehicle 10. Detection signals of sensors provided at respective portions of the vehicle 10 are input to the control device 20. For example, an accelerator position sensor, a brake sensor, and a vehicle speed sensor are connected to the general control unit 21. For example, a crank position sensor, a water temperature sensor, and an air flow meter are connected to the engine control unit 22. The crank position sensor outputs a crank angle signal every time the crankshaft rotates by a predetermined angle. The engine control unit 22 calculates a rotation phase of the crankshaft and an engine rotation speed NE which is a rotation speed of the crankshaft based on the crank angle signal.

The current, voltage and temperature of the battery are input to the motor control unit 23 via the power control unit 35. The motor control unit 23 calculates a ratio of the remaining charge amount to the charge capacity of the battery based on the current, the voltage, and the temperature.

Each of the engine control unit 22 and the motor control unit 23 is connected to the general control unit 21 by a communication line. The general control unit 21, the motor control unit 23, and the engine control unit 22 mutually exchange and share information based on detection signals input from sensors and calculated information by CAN communication.

Cranking

As described above, the first motor-generator 31 is a motor that drives the crankshaft of the engine 33 to crank the engine 33. When starting the engine 33, the control device 20 drives the first motor-generator 31 by the motor control unit 23 to realize cranking.

Figure 3:
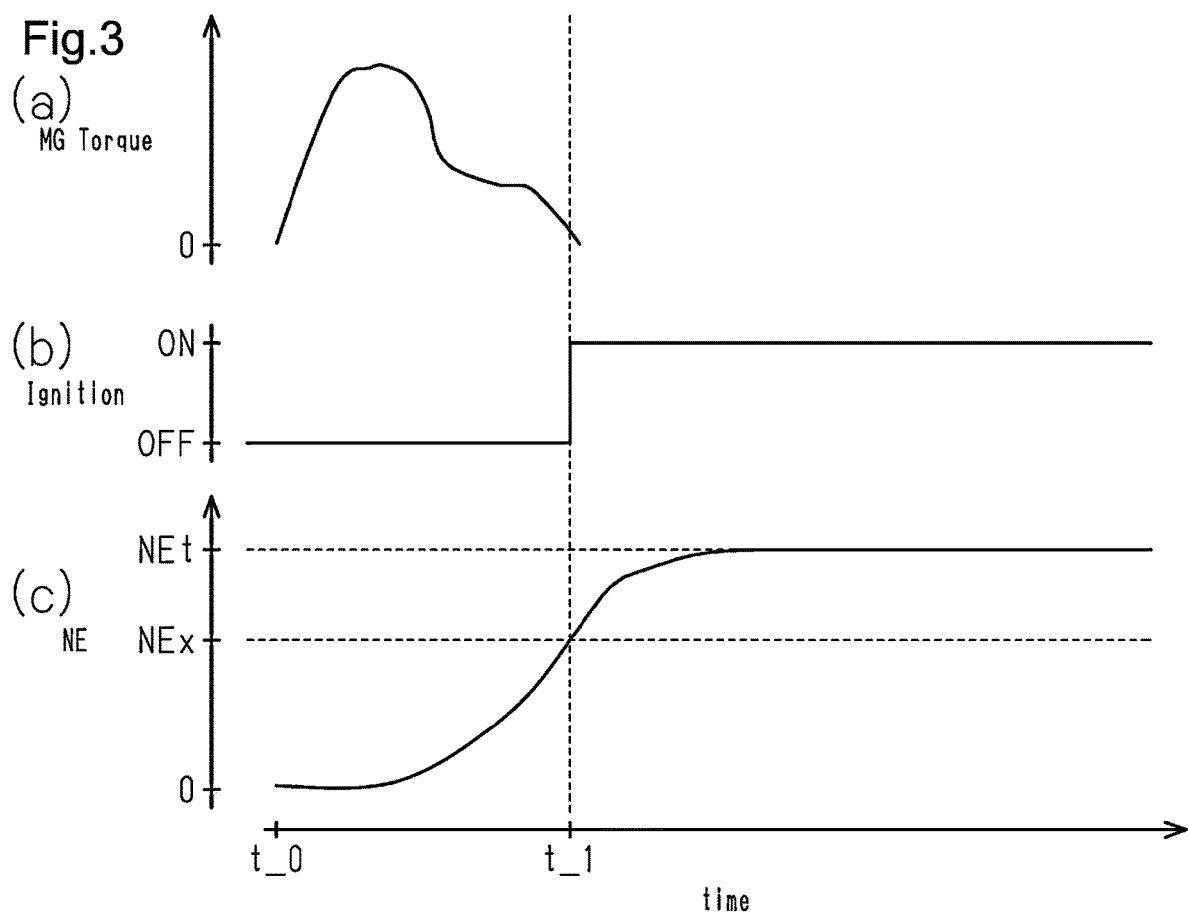
FIG. 3 is a timing diagram of parameters when an engine is started, in which part (a) shows transition of torque of a motor-generator, part (b) shows presence or absence of ignition, and part (c) shows transition of an engine rotation speed.

FIG. 3 shows a transition of the MG torque at the time of starting the engine 33, a transition of the presence or absence of the ignition control in the engine 33, and a transition of the engine speed NE. The MG torque is a torque of the first motor-generator 31. As shown in part (a) of FIG. 3, when starting of the engine 33 is started at time t_0, the motor control unit 23 increases the MG torque and starts cranking for rotating the crankshaft by the driving force of the first motor-generator 31.

When the engine rotation speed NE reaches the prescribed rotation speed NEx at the time t_1 as shown in part (c) of FIG. 3, the ignition control in the engine 33 is turned on as shown in part (b) of FIG. 3, and the engine control unit 22 starts the ignition control. When the ignition control is performed in this way, the engine 33 starts self-sustaining operation. Therefore, the motor control unit 23 sets the MG torque to 0 and terminates the cranking as shown in part (a) of FIG. 3. When the engine rotation speed NE converges to the target rotation speed NEt, the start of the engine 33 is completed.

Until the cranking is finished in this way, the motor control unit 23 controls the MG torque so that the start of the engine 33 can be quickly completed while suppressing vibration and noise as much as possible.

A control map for cranking is stored in the control device 20. The control map is a function for outputting the command value of the MG torque to the first motor-generator 31 in accordance with the elapsed time from the start of the control of the MG torque for cranking.

Figure 4:
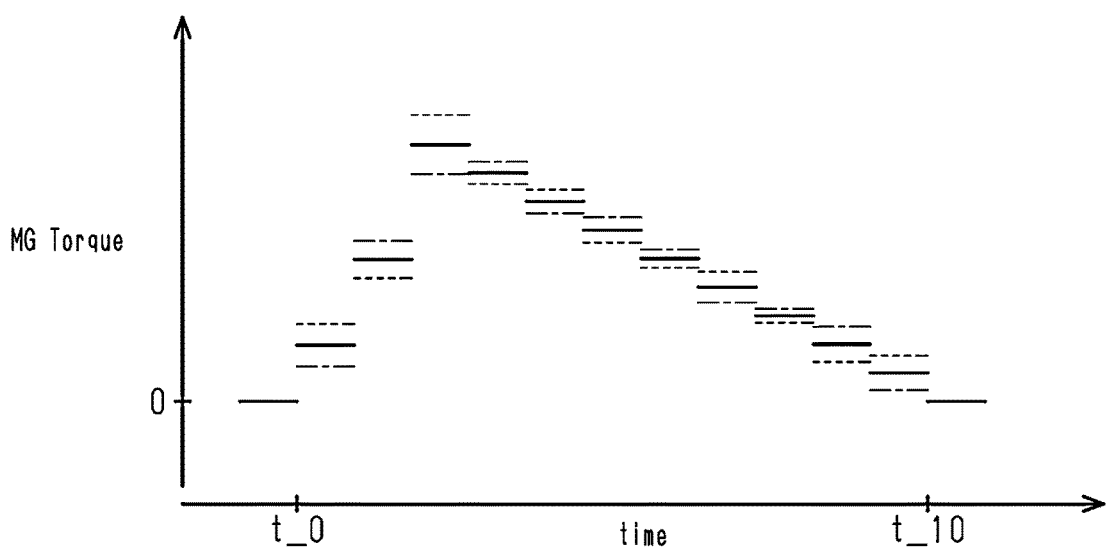
FIG. 4 is an explanatory diagram illustrating an example of a control map of a command value of torque.

For example, as indicated by the solid line in FIG. 4, the control map stores the value of the command value of the MG torque for each elapsed time period from the start of the control. In the following description, the command value of the MG torque stored in the control map is referred to as a torque variable. The motor control unit 23 reads the torque variable for each elapsed time zone from the control map. Then, the motor control unit 23 controls the first motor-generator 31 in accordance with the read torque variable to perform cranking.

The control map must be designed to meet various requirements. For example, in order to quickly start the engine 33 while suppressing noise and vibration, an appropriate combination of torque variables is searched for while repeating the test. Adaptation system 100 automatically performs such control map adaptation operations.

As shown in FIG. 1, the adaptation operation is performed in a state where the adaptation system 100 is connected to the vehicle 10 as shown in FIG. 1.

Control Map Adaptation Operation by Adaptation System 100

As shown in FIG. 1, the adaptation operation is performed in a state where the adaptation system 100 is connected to the vehicle 10 as shown in FIG. 1. The adaptation system 100 is connected to a control device 20 of the vehicle 10. When the adaptation work is performed, the microphone 50 and the acceleration sensor 51 are attached to the vehicle 10. The microphone 50 and the acceleration sensor 51 are connected to the adaptation system 100. The adaptation system 100 connected to the control device 20 is able to communicate with the control device 20. Therefore, the adaptation system 100 can control the hybrid system 30 via the control device 20. The adaptation system 100 can acquire various kinds of data acquired by the control device 20 with the sensors mounted on the vehicle 10.

The adaptation system 100 performs the control map adaptation operation using a method called black box optimization. In this adaptation method, the following trial is performed by the processing circuit 101. That is, the first motor-generator 31 is driven to crank the engine 33 and start the engine 33 while obtaining the state variable acquired by the sensor in a state where the calculation map is changed. In this adaptation method, an evaluation is performed to calculate a reward based on the acquired state variable. In this adaptation method, learning is performed to update the control map based on the reward.

In this adaptation method, the control map stored in the control device 20 is optimized by causing the processing circuitry 101 to repeatedly execute a learning routine including trials, evaluations, and learning. In this embodiment, the state variables include the engine rotation speed NE detected by the crank position sensor, the sound pressure detected by the microphone 50, and the acceleration detected by the acceleration sensor 51.

In the learning routine, the processing circuitry 101 performs each of the first trial and the second trial in which a change is made to the control map so as to adjust the torque variable in a direction opposite to the positive or negative direction.

FIG. 4 shows torque variables stored in a control map for cranking. In this example, the period during which the control for cranking is executed is, for example, 2 seconds. In the example shown in FIG. 4, the torque variable for each elapsed time is shown between time t_0 which is the control start time point and time t_10 which is the control end time point.

In FIG. 4, the torque variable before the control map is changed is indicated by a solid line. As indicated by the broken line in FIG. 4, the change in the first trial randomly adjusts, within a specified adjustment range, the torque variable for each elapsed time range in the control map. On the other hand, as indicated by the one dot chain line in FIG. 4, the change in the second trial is a change in which the adjustment in the change in the first trial is reflected in the control map by reversing the positive and negative. Therefore, as shown in FIG. 4, the torque variable in the first trial and the torque variable in the second trial are at symmetrical positions with respect to the torque variable before change.

In the learning routine, the processing circuitry 101 executes each of the first trial and the second trial while acquiring the state variable. Then, the processing circuitry 101 performs evaluation for calculating a reward based on the acquired state variable. For example, the run duration of a trial may be up to 3 seconds. The processing circuit 101 performs the trial until three seconds elapse after the cranking is started or until the engine rotational speed NE converges to the target rotational speed NEt. The processing circuit 101 calculates the score according to the elapsed time so that the longer the elapsed time from the start of cranking to the end of the trial is, the smaller the reward is. For example, the processing circuitry 101 calculates a score having a negative value such that the longer the elapsed time until the trial ends, the greater the absolute value of the score. When the sound pressure exceeds a certain level, the processing circuitry 101 calculates a score having a negative value such that an absolute value increases as the sound pressure increases. When the acceleration exceeds a certain level, the processing circuitry 101 calculates a score having a negative value such that an absolute value increases as the acceleration increases. The acceleration sensor 51 detects acceleration in three directions of up and down, left and right, and front and rear of the vehicle 10. When the acceleration in any direction exceeds a certain level, the processing circuitry 101 calculates a score having a negative value such that the absolute value increases as the acceleration increases. The processing circuitry 101 calculates the sum of these scores in one trial as the reward in the trial. The reward becomes a negative value. Therefore, the processing circuitry 101 evaluates that the smaller the absolute value of the reward value is, the larger the reward is and the higher the evaluation is.

Then, in the learning routine, the processing circuitry 101 updates the control map by reflecting the change of the control map in the trial with the larger reward among the first trial and the second trial. That is, in the learning routine, the processing circuitry 101 updates the control map by reflecting, in the control map, the torque variable in one of the first trial and the second trial in which the reward is larger.

The adaptation system 100 repeatedly executes the learning routine and gradually updates the control map so that the reward increases. As a result, the adaptation system 100 optimizes the control map so that the start of the engine 33 can be promptly completed while suppressing vibration and noise as much as possible.

As the optimization of the control map approaches completion, it is preferable that the reward converges to a large value and the learning gradually converges. However, the value of the reward may continue to fluctuate due to the influence of accidental fluctuation of the state variable caused by various external factors such as noise of the signal from the sensor and a difference in the state of combustion in the engine 33. As a result, even when the number of times of execution of the learning routine increases, the torque variable in the control map fluctuates every time the learning routine is executed, making it difficult for the learning to converge.

For example, the transition of the engine rotation speed NE changes depending on the difference in the state of combustion in the engine 33 after the end of cranking. As a result, the time required for the engine speed NE to converge to the target engine speed NEt varies every time the trial is performed. In this case, even if the number of times of execution of the learning routine increases, the reward continues to fluctuate, and thus the learning is unlikely to converge.

Therefore, the adaptation system 100 adopts an adaptation method in which the learning routine at the final stage is devised to solve the above problem.

Flow of a Series of Processes Executed by Adaptation System 100

Next, a flow of a series of processes according to the adaptation method in the adaptation system 100 will be described with reference to FIG. 5.

Figure 5:
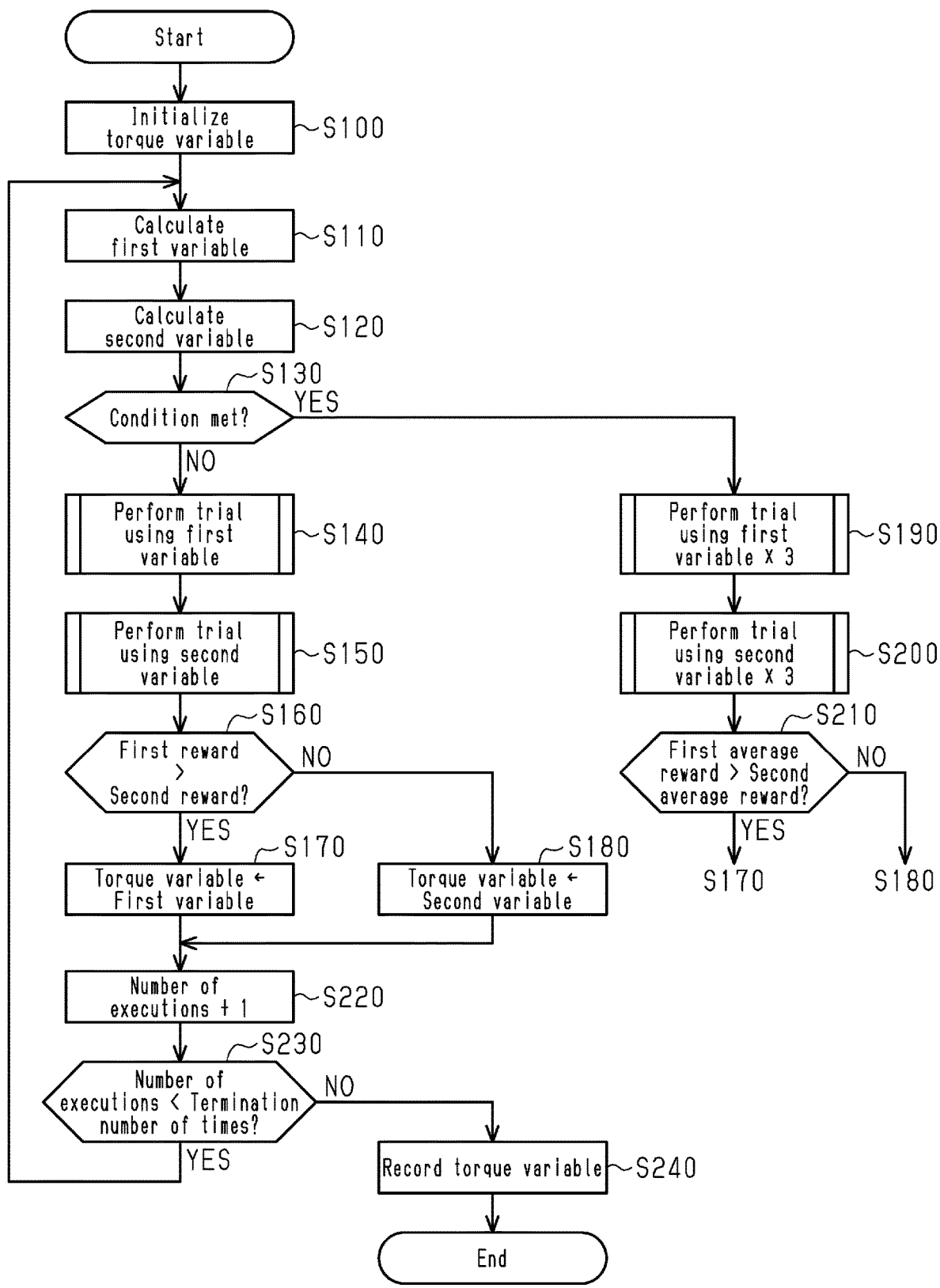
FIG. 5 is a flowchart showing the procedure of processes executed by the adaptation system.

FIG. 5 is a flowchart illustrating a flow of a series of processes according to the adaptation method executed by the adaptation system 100. This series of processes is executed by the processing circuit 101 in a state where the adaptation system 100 is connected to the vehicle 10 as shown in FIG. 1.

As shown in FIG. 5, first, in the process of step S100, the processing circuitry 101 initializes the torque variable in the control map stored in the storage device 102. The storage device 102 stores a control map similar to the control map stored in the control device 20 of the vehicle 10. In the process of step S100, the processing circuitry 101 initializes the torque variable in the control map to an initial value. Although the initial value is not optimized, it is a torque variable set in advance so that the crankshaft can be rotated.

The processing circuitry 101 calculates a first variable in the process of step S110. The first variable is a torque variable in a control map used in the first trial. In the process of step S110, the processing circuitry 101 randomly adjusts the torque variable for each elapsed time in the control map stored in the storage device 102 within a prescribed adjustment range. The first variable is the torque variable thus adjusted.

In the process of the next step S120, the processing circuitry 101 calculates a second variable. The second variable is the torque variable in the control map used in the second trial. In the process of step S120, the processing circuitry 101 reverses the sign of the adjustment in the process of step S110, adjusts the torque variable for each elapsed time in the control map stored in the storage device 102, and calculates the second variable.

In the process of the next step S130, the processing circuitry 101 determines whether or not a prescribed condition for determining that the optimizing has progressed to the final stage is satisfied. The prescribed condition is, for example, that the number of executions of the learning routine is equal to or greater than a prescribed number. The adaptation system 100 performs optimization of the control map by repeating the learning routine until the number of executions reaches the number of terminations. The number of times of termination is set to, for example, 1000 times. The prescribed number of times is less than the ending number of times. For example, the prescribed number of times is set to 900 times. The termination number and the prescribed number are hyper-parameters to be adjusted in advance in designing the adaptation method. The processing circuitry 101 determines that the prescribed condition is satisfied when the number of executions is equal to or greater than the prescribed number in the process of step S130. That is, the prescribed number of times is a threshold value of the number of executions for determining that the optimization has progressed to the final stage.

The prescribed condition may be a condition under which it can be determined that the optimization has progressed to the final stage. As the optimization progresses, the reward per trial decreases. Therefore, the prescribed condition may be that the reward in the previous learning routine is less than a prescribed value. As the optimization progresses, the reward may not decrease even if the learning routine is repeated. Therefore, the prescribed condition may be that the decrease of the reward is stagnant. For example, when a state in which a difference obtained by subtracting the reward in the previous learning routine from the reward in the learning routine before the previous learning routine is less than a prescribed value continues, it may be determined that the decrease in the reward is stagnant. As the optimization progresses, the engine speed NE gradually approaches the target engine speed NEt in the trial. Therefore, the prescribed condition may be that the engine rotational speed NE during the trial in the previous learning routine has reached a prescribed rotational speed or more.

When the prescribed condition is not satisfied (step S130: NO), the processing circuitry 101 advances the processing to step S140.

In the process of step S140, the processing circuitry 101 performs the first trial which is a trial using the first variable. Specifically, the processing circuit 101 attempts to start the engine 33 of the vehicle 10 by using the first variable. That is, the processing circuit 101 tries to start the engine 33 by causing the control device 20 to output the first variable as the command value of the MG torque. Then, the processing circuitry 101 acquires the state variables until the trial ends. The processing circuitry 101 calculates the score based on the state variable as described above and calculates the first reward by summing up the scores. Upon completion of the first trial, the processing circuitry 101 advances the processing to step S150.

In the process of step S150, the processing circuitry 101 performs a second trial which is a trial using a second variable. Specifically, the processing circuit 101 attempts to start the engine 33 of the vehicle 10 by using the second variable. That is, the processing circuit 101 tries to start the engine 33 by causing the control device 20 to output the second variable as the command value of the MG torque. Then, the processing circuitry 101 acquires the state variables until the trial ends. The processing circuitry 101 calculates the score in the same manner as the first trial and calculates the second reward by summing up the scores.

When the second trial ends in this way, the processing circuitry 101 advances the processing to step S160.

In the process of step S160, the processing circuitry 101 determines whether or not the first reward is greater than the second reward.

When the first reward is greater than the second reward (step S160: YES), the processing circuitry 101 advances the processing to step S170. In the process of step S170, the processing circuitry 101 overwrites the first variable on the control map to update the torque variable of the control map to the first variable. On the other hand, when the first reward is equal to or less than the second reward (step S160: NO), the processing circuitry 101 advances the processing to step S180. In the process of step S180, the processing circuitry 101 overwrites the second variable on the control map to update the torque variable of the control map to the second variable.

The process from step S160 to step S180 is a process of updating the control map by reflecting the change in one trial of the first trial and the second trial in which the reward is larger in the control map. When the first reward and the second reward are equal to each other, the processing circuitry 101 may change the torque variable in the control map to the first variable. When the first reward and the second reward are equal to each other, the processing circuitry 101 may not change the torque variable of the control map.

When the processing circuitry 101 updates the control map by reflecting the change in one of the first trial and the second trial in which the reward is larger in the control map, the processing circuitry 110 ends the learning routine.

As described above, when the prescribed condition is not satisfied, the processing circuitry 101 performs the first process of performing the first trial and the second trial and reflecting the change in the trial with the larger reward among the first trial and the second trial on the control map.

Next, in the process of step S220, the processing circuitry 101 adds 1 to the number of executions of the learning routine and sets the sum as a new number of executions. The initial value of the number of executions of the learning routine is 0. Then, in the process of step S230, the processing circuitry 101 determines whether or not the number of executions is less than the number of terminations. When the execution count is less than the termination count (step S230: YES), the processing circuitry 101 returns the processing to step S110. The processing circuitry 101 repeatedly executes the first processing until a prescribed condition is satisfied.

When the prescribed condition is satisfied, the processing circuitry 101 determines in the process of step S130 that the prescribed condition is satisfied (step S130: YES). When the prescribed condition is satisfied (step S130: YES), the processing circuitry 101 advances the processing to step S190.

In the process of step S190, the processing circuitry 101 performs the first trial which is a trial using the first variable a plurality of times. In this embodiment, the processing circuitry 101 performs the first trial three times. The processing circuitry 101 calculates a score based on the state variable in each of the plurality of times of first trial and calculates the first reward by summing up the scores. When the first trial is performed a plurality of times, the processing circuitry 101 advances the process to step S200.

In the process of step S200, the processing circuitry 101 performs a second trial, which is a trial using the second variable, a plurality of times. The number of times the first trial is performed in the process of step S190 is the same as the number of times the second trial is performed in the process of step S200. In this embodiment, the processing circuitry 101 performs the second trial three times. Similarly to the process of step S190, the processing circuitry 101 calculates a score in each of the plurality of second trials and calculates a second reward by summing up the scores. Upon completion of the plurality of second trials, the processing circuitry 101 advances the processing to step S210.

In the process of step S210, the processing circuitry 101 determines whether or not the first average reward is greater than the second average reward. The first average reward is an average value of the plurality of first rewards calculated through the process of step S190. The second average reward is an average value of the plurality of second rewards calculated through the process of step S200.

When the first average reward is greater than the second average reward (step S210: YES), the processing circuitry 101 advances the processing to step S170. In the process of step S170, the processing circuitry 101 overwrites the first variable on the control map to update the torque variable of the control map to the first variable. On the other hand, when the first average reward is equal to or less than the second average reward (step S210: NO), the processing circuitry 101 advances the processing to step S180. In the process of step S180, the processing circuitry 101 overwrites the second variable on the control map to update the torque variable of the control map to the second variable. In the processing including step S210, step S170, and step S180, rewards of a plurality of times of first trial are compared with rewards of a plurality of times of second trials, and a change in one trial having a larger reward among the first trial and the second trials is reflected in the control map. When the first average reward and the second average reward are equal to each other, the processing circuitry 101 may change the torque variable of the control map to the first variable. When the first average reward and the second average reward are equal to each other, the processing circuitry 101 may not change the torque variable of the control map. After updating the control map in this way, the processing circuitry 101 ends the learning routine.

As described above, when the prescribed condition is satisfied, the processing circuitry 101 performs the second process in which the first trial and the second trial are performed a plurality of times, and a change in one of the first trial and the second trial in which the reward is larger is reflected in the control map.

When the execution count is less than the termination count (step S230: YES), the processing circuitry 101 returns the processing to step S110. After the prescribed condition is satisfied, the processing circuitry 101 repeatedly executes the second process until the number of executions reaches the end number.

When the execution count reaches the end count, the processing circuitry 101 determines that the execution count is equal to or greater than the end count in the process of step S230 (step S230: NO). In this case, the processing circuitry 101 advances the processing to step S240.

In the process of step S240, the processing circuit 101 records the torque variable of the control map stored in the storage device 102 in the storage device 102 as the control map to be stored in the control device 20, and completes the optimizing of the control map.

The data of the optimized control map recorded in the storage device 102 of the adaptation system 100 is stored in the control device 20 of the vehicle 10. Thus, the vehicle 10 can quickly complete the start of the engine 33 while suppressing vibration and noise as much as possible.

Operation of Present Embodiment

The adaptation method executed by the adaptation system 100 includes a first step of executing the first process and a second step of executing the second process. In this adaptation method, the learning routine of the second step is executed after a prescribed condition for determining that the optimization has progressed to the final stage is met. In the learning routine of the second step, trials are executed multiple times without changing the torque variable, and then the torque variable in one of the first trial and the second trial that has a larger reward is adopted. In this case, when the magnitudes of rewards are compared, the rewards in multiple executions of the trials are used. Therefore, even if an accidental change in the state variable occurs due to noise or the like in signals from sensors in any of execution of the trials, the change is unlikely to affect the determination of the torque variable.

Advantages of Present Embodiment (1) It is possible to prevent fluctuations of a state variable due to noise in signals of sensors or the like from disturbing the convergence of the learning in the final stage of the optimization of the control map.

(2) The state variables include the engine rotation speed NE detected by the crank position sensor, the sound pressure detected by the microphone 50, and the acceleration detected by the acceleration sensor 51. This allows the adaptation system 100 to optimize the control map by reflecting the information on the noise and the vibration in cranking.

Modifications

The present embodiment may be modified as follows. The present embodiment and the following modifications can be combined as long as the combined modifications remain technically consistent with each other.

In the second process, the control map is updated by reflecting a change in one of the first trial and the second trial in which the average value of the rewards of the plurality of trials is larger than that of the other trial in the control map, and the learning routine is ended. The first trial and the second trial are performed a plurality of times, and a second process is executed in which a change in one of the first trial and the second trial in which the reward is larger is reflected on the control map. A specific embodiment of the second treatment is not limited to such an embodiment. For example, the mode of comparing rewards for a plurality of trials is not limited to the mode of comparing average values. For example, when each of the first trial and the second trial is performed three times in the learning routine, the processing circuitry 101 compares the reward between the first trials, the reward between the second trials, and the reward between the third trials. Then, the processing circuitry 101 reflects, on the control map, a change in one of the first trial and the second trial in which the number of times that the reward is determined to be large is large. Such an embodiment may be adopted. In addition, for example, the processing circuitry 101 arranges a total of six rewards in which three rewards of three first trial trials and three rewards of three second trials are combined in descending order. Then, the processing circuitry 101 reflects the change of one trial in which two or more rewards are included in the top three on the control map. Such an embodiment may be adopted.

In the above-described embodiment, the adaptation of the control map of the first motor-generator 31 when cranking the engine 33 is exemplified. The adaptation method described above can also be applied to other motor controls. For example, the present invention can be applied to adaptation of a function used for control of a driving motor of an electric vehicle or control of a motor for driving an electric actuator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An adaptation system for optimizing a function used to control a motor, the system comprising:
processing circuitry; and
a storage device, wherein
the processing circuitry is configured to repeat a learning routine until a number of executions of the learning routine reaches a number of terminations, thereby optimizing the function to be stored in a control device for controlling the motor, the learning routine including:
a trial that drives the motor while acquiring a state variable by a sensor in a state in which a change has been added to the function for outputting a command value to the motor;
an evaluation that calculates a reward based on the acquired state variable; and
learning that updates the function based on the reward, and
the processing circuitry is configured to execute
a first process that, until a specified condition for determining that optimization has progressed to a final stage is met, performs a first trial and a second trial in which the change is added to the function so as to adjust, in a sign reversing direction, the command value output from the function in each execution of the learning routine, updates the function by reflecting, in the function, the change in one of the first trial and the second trial in which the reward is larger, and ends the learning routine, and
a second process that, until the number of executions of the learning routine reaches the number of terminations after the specified condition is met, executes the first trial and the second trial multiple times in each learning routine, compares the reward for the multiple executions of the first trial with the reward for the multiple executions of the second trial, updates the function by reflecting, in the function, the change in one of the first trial and the second trial in which the reward is larger, and ends the learning routine, wherein
the processing circuitry is configured to, in the second trial:
perform each of the first trial and the second trial three times;
compare the reward between the first trials, the reward between the second trials, and the reward between the third trials; and
reflect, in the function, a change in one of the first trial and the second trial in which the number of times that the reward is determined to be large is large.

2. The adaptation system according to claim 1, wherein the processing circuitry is configured to, in the second process, update the function by reflecting, in the function, the change in one of the first trial and the second trial that has a larger average value of the reward in the multiple executions, and end the learning routine.

3. The adaptation system according to claim 1, wherein
the function is a control map that outputs the command value to the motor in accordance with an elapsed time from a start of control,
the change in the first trial randomly adjusts, within a specified adjustment range, the value of the command value for each elapsed time range in the control map, and
the change in the second trial performs the adjustment of the command value for each elapsed time range in the change of the first trial on the command value for each elapsed time range in the control map after reversing the sign of the adjustment.

4. The adaptation system according to claim 1, wherein
the function is used in control of cranking an engine mounted on a vehicle by driving a crankshaft of the engine by the motor,
the trials are trials of cranking the engine by the motor to start the engine, the sensor includes:
a crank position sensor that detects an engine rotation speed of the engine;
a microphone that detects sound generated by the vehicle; and
an acceleration sensor that detects acceleration of the vehicle, and the state variable includes:
the engine rotation speed detected by the crank position sensor;
a sound pressure detected by the microphone; and
an acceleration detected by the acceleration sensor.

5. The adaptation system according to claim 1, wherein
the specified condition is that the number of executions of the learning routine is equal to or greater than a prescribed number.

6. The adaptation system according to claim 1, wherein
the specified condition is that the reward in the previous learning routine is less than a prescribed value.

7. The adaptation system according to claim 1, wherein
the specified condition is that an engine rotational speed during the trial in the previous learning routine has reached a prescribed rotational speed or more.

8. An adaptation system for optimizing a function used to control a motor, the system comprising:
processing circuitry; and
a storage device, wherein
the processing circuitry is configured to repeat a learning routine until a number of executions of the learning routine reaches a number of terminations, thereby optimizing the function to be stored in a control device for controlling the motor, the learning routine including:
a trial that drives the motor while acquiring a state variable by a sensor in a state in which a change has been added to the function for outputting a command value to the motor;
an evaluation that calculates a reward based on the acquired state variable; and
learning that updates the function based on the reward, and
the processing circuitry is configured to execute
a first process that, until a specified condition for determining that optimization has progressed to a final stage is met, performs a first trial and a second trial in which the change is added to the function so as to adjust, in a sign reversing direction, the command value output from the function in each execution of the learning routine, updates the function by reflecting, in the function, the change in one of the first trial and the second trial in which the reward is larger, and ends the learning routine, and
a second process that, until the number of executions of the learning routine reaches the number of terminations after the specified condition is met, executes the first trial and the second trial multiple times in each learning routine, compares the reward for the multiple executions of the first trial with the reward for the multiple executions of the second trial. updates the function by reflecting, in the function, the change in one of the first trial and the second trial in which the reward is larger, and ends the learning routine, wherein
the processing circuitry is configured to, in the second trial:
perform each of the first trial and the second trial three times;
arrange a total of six rewards in which three rewards of three first trial trials and three rewards of three second trials are combined in descending order; and
reflect, in the function, a change in one of the first trial and the second trial in which two or more rewards are included in the top three.

* * * * *